United States Patent [19]

Gray

[11] Patent Number: 5,545,379

[45] Date of Patent: Aug. 13, 1996

[54] CORONA DISCHARGE SYSTEM WITH INSULATED WIRE

[75] Inventor: Buddy Don Gray, Giles County, Tenn.

[73] Assignee: Teledyne Industries, Inc., Huntsville, Ala.

[21] Appl. No.: 16,146

[22] Filed: Feb. 5, 1993

[51] Int. Cl.⁶ ................................. B01J 19/12
[52] U.S. Cl. .................. 422/186.04; 422/186.07; 422/186.18; 422/907
[58] Field of Search ............ 422/186.07, 186.04, 422/186.18, 907

[56] References Cited

U.S. PATENT DOCUMENTS

| | | | |
|---|---|---|---|
| 648,764 | 11/1900 | Lamprey | 422/186.07 |
| 927,519 | 7/1909 | Friedlander | 422/186.07 |
| 1,326,631 | 12/1919 | Bayeux et al. | 422/186.07 |
| 1,793,799 | 2/1931 | Hartman | 422/186.07 |
| 2,093,619 | 9/1937 | Powell | 204/32 |
| 2,155,675 | 4/1939 | Napier | 204/32 |
| 3,405,052 | 10/1968 | Schirmer | 204/312 |
| 3,622,492 | 11/1971 | Kinney | 204/322 |
| 3,865,733 | 2/1975 | Taylor | 250/532 |
| 3,942,020 | 3/1976 | Ciambrone | 250/539 |
| 3,967,131 | 6/1976 | Slipiec et al. | 250/539 |
| 4,770,858 | 9/1988 | Collins | 422/186.18 |
| 4,774,062 | 9/1988 | Heinemann | 422/186.19 |
| 4,834,948 | 5/1989 | Schmiga et al. | 422/186.19 |
| 4,869,881 | 9/1989 | Collins | 422/186.18 |
| 4,940,894 | 7/1990 | Morters | 250/324 |
| 4,956,152 | 9/1990 | Keough et al. | 422/186.07 |
| 4,966,666 | 10/1990 | Waltonen | 204/164 |
| 4,986,968 | 1/1991 | Hirth et al. | 422/186.19 |
| 5,087,428 | 2/1992 | Fletcher et al. | 422/186.07 |
| 5,089,098 | 2/1992 | Tacchi | 204/176 |
| 5,316,741 | 5/1994 | Sewell et al. | 422/186.21 |
| 5,413,769 | 5/1995 | Okazaki et al. | 422/186.07 |

OTHER PUBLICATIONS

Condensed Chemical Dictionary, 10th Ed., G. G. Hawley, Van Nostrand Reinhold Co., 1981, p. 839.

Primary Examiner—Charles T. Jordan
Assistant Examiner—Daniel Jenkins
Attorney, Agent, or Firm—Dickstein, Shapiro & Morin, L.L.P.

[57] ABSTRACT

A rugged, flexible unit for generating a corona discharge includes a conductive central wire, flexible dielectric material, and a flexible conductive layer surrounding said dielectric material. The dielectric material may be advantageously formed of PTFE. The flexible unit may be conveniently cut from a long length of prefabricated insulated wire. In operation, an alternating current is supplied to the central wire and the outer conductive layer is grounded, such that a corona discharge is efficiently generated within and around interstices formed by the outer layer. The corona discharge may be used to ozonate oxygen-rich gas.

19 Claims, 3 Drawing Sheets

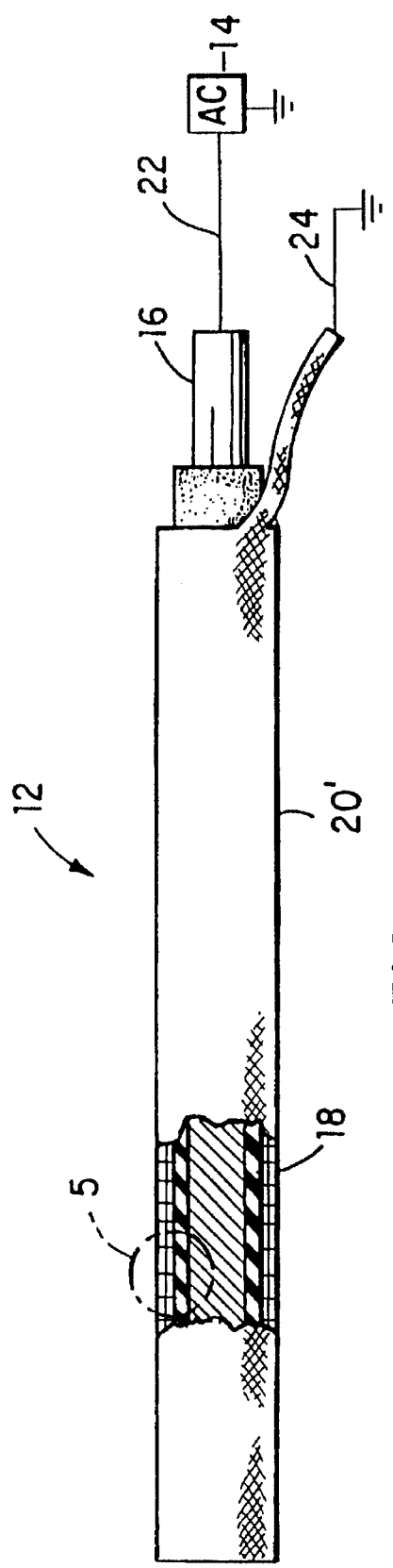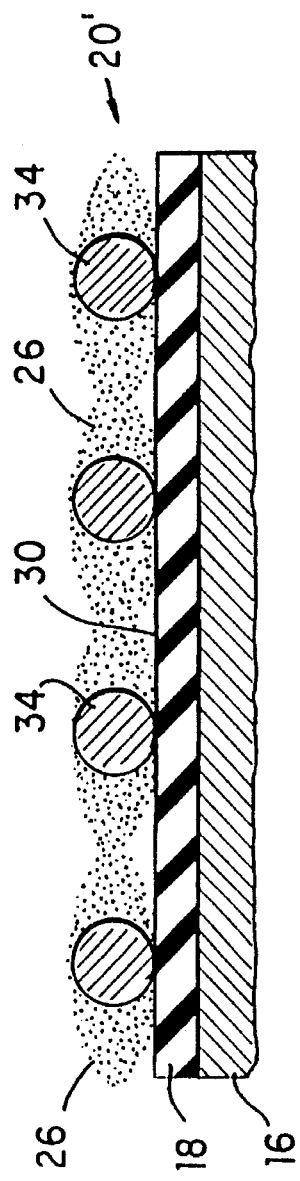

5,545,379

CORONA DISCHARGE SYSTEM WITH INSULATED WIRE

BACKGROUND OF THE INVENTION

1. Field of the Invention

The present invention relates to a system for generating a corona discharge. The present invention particularly relates to an in-place corona discharge system for producing ozone. The present invention also relates to an improved method of making a corona discharge apparatus.

2. Description of the Related Art

Known systems for producing ozone include systems for irradiating air (or another oxygen-rich gas) with ultraviolet light, and systems for generating a corona discharge. The known corona discharge systems include flow-through type apparatuses and in-place type apparatuses. In the flow-through type apparatuses, an oxygen-rich gas flows through a corona discharge element. In-place type ozone generating corona discharge apparatuses are disclosed in U.S. Pat. Nos. 1,793,799 (Hartman) and U.S. Pat. No. 2,093,619 (Powell).

Hartman's apparatus is formed of a glass tube with a metallic interior. A wire mesh is located on the exterior of the glass tube. Hartman's apparatus is relatively complicated and therefore would be relatively expensive to manufacture. Moreover, Hartman's glass tube is not flexible. Therefore, it would be difficult to produce Hartman's apparatus in different lengths and in different shapes. Because of its inflexibility, Hartman's apparatus could not be readily adapted for different system applications. Moreover, Hartman's apparatus is formed of fragile materials, making the apparatus unacceptable for certain applications. For example, Hartman's apparatus would not be well suited for space flight systems because of the high vibrational and inertial stresses imposed during takeoff and flight.

The apparatus disclosed by Powell would have some of the same disadvantages as the apparatus disclosed by Hartman. The Powell apparatus is complicated, and would be expensive to mass produce. The Powell apparatus is also a rigid construction. Therefore, the Powell apparatus would be susceptible to degradation by vibrational and other mechanical stresses. Moreover, it would be uneconomical to produce the Powell apparatus in different sizes and shapes. Moreover, the Powell apparatus, like the Hartman apparatus, utilizes a glass dielectric material, which is disadvantageously fragile and difficult to work with.

The known ozone generating systems are disadvantageous because they require an excessive amount of power, and because they are difficult to manufacture. The known systems also have components that are fragile. The fragility of the known systems makes them impractical for many applications, including manned space flight systems.

SUMMARY OF THE INVENTION

The disadvantages of the prior art are alleviated to a great extent by the present invention which provides an ozone generating system formed of a conductive central wire, a dielectric material surrounding the wire, and a conductive outermost layer.

In a preferred embodiment of the invention, the dielectric material is a flexible, extruded polytetrafluoroethylene ("PTFE") polymer. The outer conductive layer may be formed of spirally wrapped or braided wire.

In operation, a high voltage alternating current is applied to the central wire and the outer conductive layer is grounded, such that a corona discharge is generated within the interstices of the spirally wrapped or braided outer layer. The corona discharge created in and around the outer conductive layer may be used to ozonate oxygen-rich air.

A corona discharge unit constructed in accordance with the present invention may be sufficiently rugged to be compatible with space and aircraft systems.

It is an object of the present invention to provide a corona discharge apparatus that has an uncomplicated design, that is rugged, and that is easy to fabricate.

Another object of the invention is to provide a corona discharge system that does not require glass components or mercury vapors, which would be hazardous in manned flight systems.

Another object of the invention is to provide a compact, lightweight, and efficient system for generating a corona discharge.

Another object of the present invention is to provide a corona discharge unit that can be easily manufactured in different lengths and in different shapes so as to be readily adaptable for use in different systems.

Another object of the invention is to provide an improved method of making a corona discharge apparatus.

Other objects and advantages of the present invention will become apparent from the following description and drawings which illustrate preferred embodiments of the present invention.

BRIEF DESCRIPTION OF THE DRAWINGS

FIG. 4 is a partial cross sectional side view of another corona discharge system constructed in accordance with the present invention.

FIG. 5 is a cross sectional enlarged view of the region designated by circle 5 in FIG. 4.

DETAILED DESCRIPTION OF PREFERRED EMBODIMENTS

Figure 1:
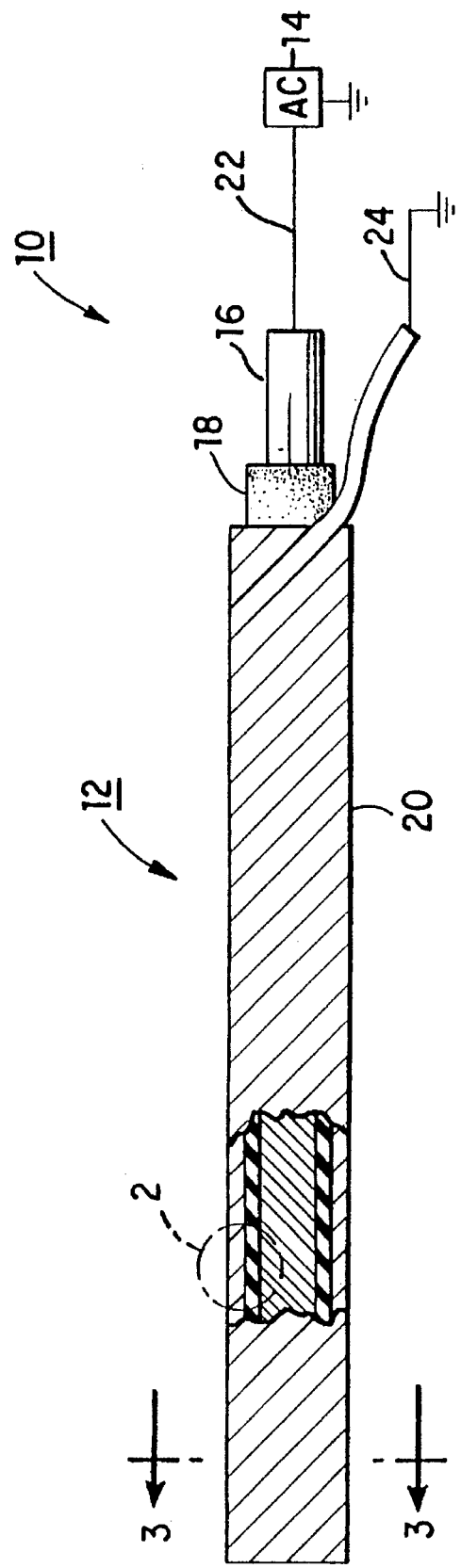
FIG. 1 is a partial cross sectional side view of a corona discharge system constructed in accordance with the present invention.

Referring now to the drawings, there is shown in FIG. 1 a corona discharge system 10 that is constructed in accordance with the present invention. The system 10 is formed of an elongated corona discharge unit 12 and a source 14 of high voltage alternating current. The corona discharge unit 12 is formed of an electrically conductive wire 16, an insulating dielectric layer 18, and a conductive layer 20. The conductive layer 20 is electrically isolated from the central wire 16 by the dielectric layer 18. The layer 20 would normally be grounded and the wire 16 would normally be connected to the alternating current source 14 by suitable leads 22, 24.

Figure 2:
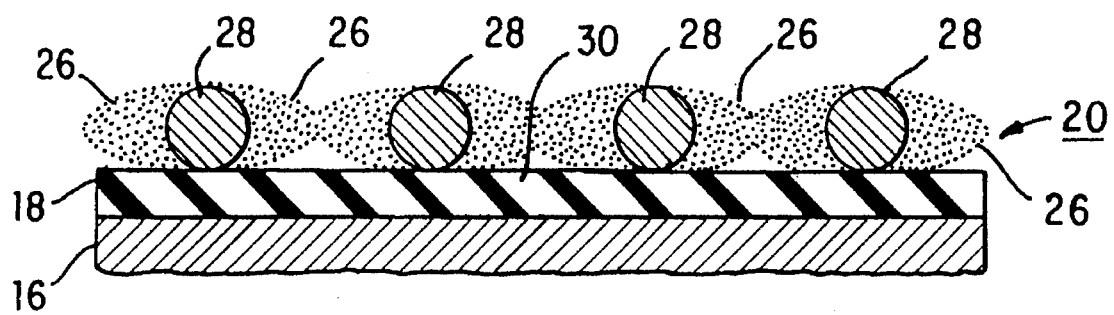
FIG. 2 is a cross sectional enlarged view of the region designated by circle 2 in FIG. 1.

In operation, a corona discharge 26 (FIG. 2) is generated when alternating current is supplied to the conductive layer 20 by the source 14. The corona discharge 26 may be used to create ozone from an oxygen-rich gas, as described in more detail below.

The central wire 16 may be formed of aluminum or copper, or any other suitable material. Preferably, the wire 16 is cut from a long length of commercially available, flexible wire. The wire 16 may have a solid circular cross section so as to reduce the complexity and expense of the system 10, and to make it easier to manufacture the system 10.

The dielectric material 18 may be formed of a fluorine-containing polymer. Fluorine-containing polymers are preferred because of their inertness and resistance to ozone. Fluorine-containing polymers are also preferred because of their ruggedness, flexibility, processibility, and commercial availability. particularly satisfactory results are achieved when the dielectric material 18 is formed essentially entirely of a commercially available polytetrafluoroethylene ("PTFE") polymer.

In a preferred embodiment of the invention, the dielectric material 18 is integrally formed by extrusion directly onto the exterior surface of the wire 16, such that there are no gaps between the interior surface of the dielectric material 18 and the exterior surface of the wire 16. The extruded dielectric material 18 advantageously has an uncomplicated cylindrical cross section with a uniform thickness. The wire 16 and dielectric material 18 may be economically taken from a long, indefinite length of flexible, PTFE insulated wire. For example, the wire 16 and dielectric material 18 may be cut from a commercially available roll of prefabricated PTFE insulated wire.

The conductive layer 20 is preferably flexible, and may be formed of spirally wrapped strands of wire 28, with interstices formed between the individual strands of wire 28 and the outer surface 30 of the dielectric material 18. The wire strands 28 advantageously have a very thin cross section, and adjacent strands 28 are spaced apart from each other by an optimum distance so as to optimize the efficiency with which the corona discharge 26 is generated by the system 10.

The present invention is especially well suited for generating ozone from air. But the invention may be used to generate ozone from any oxygen-rich gas which can be fed into close proximity to the conductive layer 20. The oxygen-rich gas may be fed toward and away from the layer 20 by induced currents. For example, the oxygen-rich gas may be fed toward and away from the layer 20 by a conventional fan. Alternatively, natural or existing convection currents may be relied upon to bring oxygen-rich gas to the interstices of the layer 20, and to draw ozone away from the corona discharge unit 12.

The corona discharge unit 12 is illustrated in FIG. 1 as having a linear shape. But the unit 12 is flexible and may be bent into a variety of shapes. Since the system 10 is uncomplicated, and since the unit 12 can be easily constructed in a wide variety of lengths and shapes, the system 10 may be used in a wide variety of applications.

For example, the corona discharge system 10 may be used to create ozone for room air purification devices, central air conditioning and heating air purifiers, refrigerator ozonators, odor removal systems, and systems for removing microbes from meats, fruits, vegetables and the like.

Because of its simplicity and ruggedness, the system 10 may have important applications in manned space flight systems. The present invention does not require glass or mercury vapors which would be hazardous in manned spacecraft.

Figure 3:
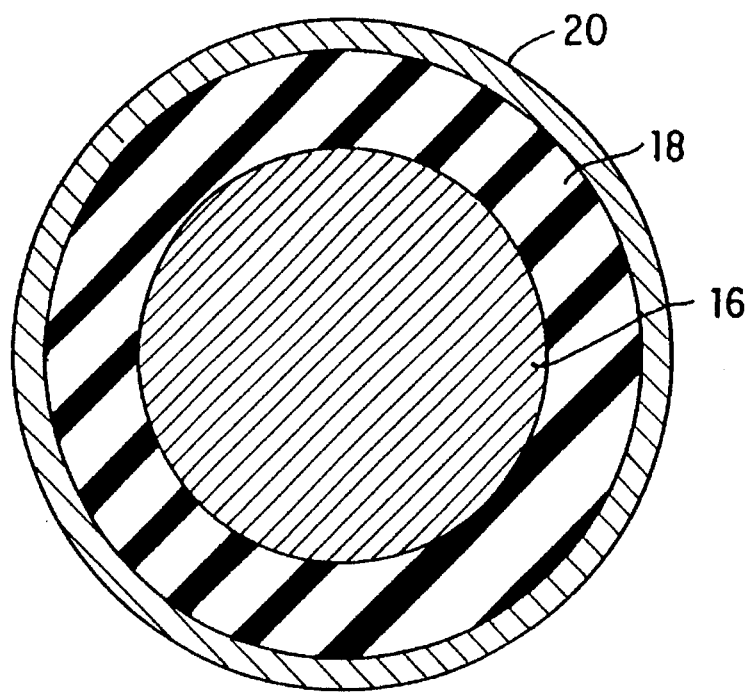
FIG. 3 is a cross sectional view taken along the line 3—3 of FIG. 1.

In an alternative embodiment illustrated in FIGS. 4 and 5, the conductive layer 20' is formed of braided wire strands 34. The embodiment of FIGS. 4 and 5 is otherwise identical in structure and operation to the embodiment illustrated in FIGS. 1 through 3. The braided strands 34, like the spirally wrapped wire strands 28, may have a thin cross section to increase corona discharge efficiency.

The corona discharge 26 causes the ionization of oxygen-rich gas by converting $O_2$ to $O_3$, and $O_3$ to $O_2$. The chemical formulas for this process, assuming pure oxygen as the feed gas are:

$$e^{-1}+O_2 \rightarrow 2O+e^{-1}, \qquad (1)$$

$$O+O_2 \rightarrow O_3 (\text{or } O+O+O \rightarrow O_3), \qquad (2)$$

$$e^{-1}+O \rightarrow O_2+O+e^{-1} (\text{also } O+O_3 \rightarrow 2O_2). \qquad (3)$$

Formulas (1) through (3) show the destruction of ozone as well as its generation. However, the rate of ozone generation exceeds the rate of ozone destruction.

The corona discharge unit 12 may be conveniently cut to a desired predetermined length from a stock supply of insulated wire. The unit 12 may be very long. The unit 12 may be as long as the longest available stock supply of insulated wire. The stock supply of insulated wire may have the conductive layer 20 already applied onto the dielectric material 18. Alternatively, the conductive layer 20 may be wrapped or braided onto the dielectric material 18 after cutting the desired length of insulated wire from the stock supply. The unit 12 may be connected to the electrical leads 22, 24 after the predetermined length is cut from the stock supply. Before or after connecting the unit 12 to the leads 22, 24, the unit 12 may be installed into position within a larger system, such as a spacecraft. The installation of the unit 12 may involve bending the unit 12 to fit the confines of the larger system as desired.

The above description and drawings are only illustrative of preferred embodiments which achieve the objects, features and advantages of the present invention, and it is not intended that the present invention be limited thereto. Any modifications of the present invention coming within the spirit and scope of the following claims is to be considered part of the present invention.

What is claimed as new and desired to be protected by Letters Patent of the United States is:

1. A system for generating ozone, comprising:

a conductive wire;

a flexible dielectric material surrounding said wire; and a conductive layer surrounding said dielectric material, said conductive layer including interstices for receiving fluid to be ozonated.

2. The system of claim 1, wherein said conductive layer includes spirally wrapped wire.

3. The system of claim 1, wherein said wire and said conductive layer are flexible.

4. The system of claim 1, wherein said conductive layer includes spirally wrapped wire.

5. The system of claim 1, wherein said conductive layer includes braided wire.

6. The system of claim 1, further comprising a high voltage source of alternating current connected to said conductive wire.

7. A system for generating ozone, comprising:

a flexible conductive wire;

a flexible dielectric material surrounding said wire and integrally formed on said wire; and a flexible conductive layer surrounding said dielectric material, said conductive layer including interstices for receiving fluid to be ozonated and including braided wire.

8. A system for generating ozone, comprising:
a flexible conductive wire;
a flexible dielectric material surrounding said wire and integrally formed on said wire, said flexible dielectric material including polytetrafluoroethylene;
a flexible conductive layer surrounding said dielectric material, said conductive layer including interstices for receiving fluid to be ozonated; and
a source of high voltage alternating current connected to said conductive wire such that operation of said source causes a corona discharge to be generated within said interstices.

9. A method of making an ozone generating system, said method comprising the steps of:
providing an insulated wire;
applying a conductive layer onto said insulated wire, said conductive layer having interstices for receiving fluid to be ozonated; and
connecting said wire to a source of alternating current.

10. A method of making an ozone generating system, said method comprising the steps of:
providing an insulated wire by cutting said insulated wire from a stock supply;
applying a conductive layer onto said insulated wire, said conductive layer having interstices for receiving fluid to be ozonated; and
connecting said wire to a source of alternating current.

11. A method of making an ozone generating system, said method comprising the steps of:
providing an insulated wire;
applying a conductive layer onto said insulated wire, said conductive layer having interstices for receiving fluid to be ozonated; and
connecting said wire to a source of alternating current,
wherein said step of applying said conductive layer onto said insulated wire includes the step of winding wire onto said insulated wire.

12. A method of making an ozone generating system, said method comprising the steps of:
providing an insulated wire;
applying a conductive layer onto said insulated wire, said conductive layer having interstices for receiving fluid to be ozonated; and
connecting said wire to a source of alternating current,
wherein said step of applying said conductive layer onto said insulated wire includes the step of braiding wire onto said insulated wire.

13. A rugged, flexible unit for generating a corona discharge to form ozone from an oxygen-rich gas, said unit comprising:
a conductive wire;
dielectric material surrounding said wire, said dielectric material including polytetrafluoroethylene, said dielectric material being integrally formed on said conductive wire; and
a conductive layer surrounding said dielectric material; and wherein said conductive layer includes wire.

14. The corona discharge unit of claim 13, wherein said conductive layer includes interstices for receiving fluid to be ozonated.

15. A system for generating ozone, comprising:
a conductive wire;
a flexible dielectric material surrounding said wire; and
a conductive layer surrounding said dielectric material, said conductive layer including interstices, wherein a corona discharge is generated within said interstices.

16. The system of claim 15, wherein said dielectric material includes a fluorine-containing polymer.

17. The system of claim 15, wherein said conductive layer includes spirally wrapped wire.

18. The system of claim 15, wherein said conductive layer includes braided wire.

19. A method of making an ozone generating system, said method comprising the steps of:
providing an insulated wire;
applying a conductive layer onto said insulated wire, said conductive layer having interstices; and
connecting said wire to a source of alternating current, such that operation of said source causes a corona discharge to be generated within said interstices.

* * * * *